(12) United States Patent
Park et al.

(10) Patent No.: US 9,418,574 B2
(45) Date of Patent: Aug. 16, 2016

(54) SURGICAL OPERATION TRAINING DEVICE

(71) Applicant: EBM Corporation, Tokyo (JP)

(72) Inventors: Young Kwang Park, Tokyo (JP); Yasuyuki Shiraishi, Tokyo (JP)

(73) Assignee: EBM Corporation, Tokyo (JP)

(*) Notice: Subject to any disclaimer, the term of this patent is extended or adjusted under 35 U.S.C. 154(b) by 321 days.

(21) Appl. No.: 14/198,515

(22) Filed: Mar. 5, 2014

(65) Prior Publication Data

US 2014/0349265 A1  Nov. 27, 2014

Related U.S. Application Data

(63) Continuation-in-part of application No. 12/920,871, filed as application No. PCT/JP2007/054033 on Mar. 2, 2007, now abandoned.

(30) Foreign Application Priority Data

Mar. 3, 2006  (JP) ................................. 2006-057195

(51) Int. Cl.
*G09B 23/28* (2006.01)
*G09B 23/32* (2006.01)

(52) U.S. Cl.
CPC ..................................... *G09B 23/32* (2013.01)

(58) Field of Classification Search
USPC .......... 434/262, 267, 268, 270, 272, 273, 274
See application file for complete search history.

(56) References Cited

U.S. PATENT DOCUMENTS 5,149,270 A * 9/1992 McKeown ........... G09B 23/285
434/262

(Continued)

FOREIGN PATENT DOCUMENTS

| JP | H5-221469 A | 8/1993 |
| JP | 2001-5378 A | 1/2001 |

(Continued)

OTHER PUBLICATIONS

Tomoyuki Yanbe et al., "Tokushu: Ikogaku Rental no Shintenkai 'Keijo Kioku Gokin Actuator o oyo Shita Jinko Shokudo Kaihatsu,' [Development of the Actuator for the Artificial Esophagus, Which Can Drink Food, by the Use of the Shape Memory Alloy]" Journal of the Japan Society of Applied Electromagnetics and Mechanics, Nov. 30, 2004, pp. 94-99, vol. 12, No. 2.

(Continued)

*Primary Examiner* — Kurt Fernstrom
(74) *Attorney, Agent, or Firm* — Konomi Takeshita

(57) ABSTRACT

A surgical operation training device 13 comprises a simulation body 83 subjected to a predetermined treatment during surgical operation training, a holder 84 for holding the simulation body 83 from below, a support 85 for supporting the holder 84 workably, a wire 86 for coupling the holder 84 with the support 85, and a control unit 71 for controlling operation of the holder 84. The wire 86 is formed of a shape memory material which can contract from an original shape when a current flows through the wire. The control unit 71 comprises a drive signal generating means 114 for supplying a current to the wire 86 at a predetermined timing and for performing operation control on the holder 84 with a change in the shape of the wire 86 by varying the supply state of current to the wire 86.

8 Claims, 13 Drawing Sheets

(56) References Cited

U.S. PATENT DOCUMENTS

| | | | | |
|---|---|---|---|---|
| 5,230,630 | A | * | 7/1993 | Burgett .................. G09B 23/28 434/262 |
| 5,403,191 | A | * | 4/1995 | Tuason ................ G09B 23/285 434/262 |
| 5,425,644 | A | * | 6/1995 | Szinicz ................. G09B 23/28 434/267 |
| 5,873,732 | A | * | 2/1999 | Hasson ................ G09B 23/286 434/262 |
| 5,947,743 | A | * | 9/1999 | Hasson ................ G09B 23/286 434/262 |
| 5,947,744 | A | * | 9/1999 | Izzat ...................... G09B 23/28 434/262 |
| 7,963,770 | B2 | * | 6/2011 | Kukora ................ G09B 23/285 434/262 |
| 7,997,903 | B2 | * | 8/2011 | Hasson ................ G09B 23/285 434/262 |
| 8,480,405 | B2 | * | 7/2013 | Hammerman ....... G09B 23/285 434/267 |
| 8,764,452 | B2 | * | 7/2014 | Pravong ................ G09B 23/30 434/262 |
| 2007/0166682 | A1 | * | 7/2007 | Yarin ................... G09B 23/285 434/267 |

FOREIGN PATENT DOCUMENTS

| | | |
|---|---|---|
| JP | 3096694 U | 9/2003 |
| JP | 2005-17997 A | 1/2005 |
| JP | 2005-202267 A | 7/2005 |
| JP | 2006-38931 A | 2/2006 |

OTHER PUBLICATIONS

Jun Nagatoshi et al., "B117 Keijo Kioku Gokin o Oyo shita Atarashii Shinshitsu Shushuku Hojo Sochi no Kaihatsu [Development of a totally-implantable artificial myocardium using a shape memory alloy fiber]," Dai 16 Kai Bio Frontier Koenkai Koen Ronbunshu, Nov. 8, 2005, pp. 77-78.

Written Opinion of PCT/JP2007/054033.

Preliminary Search Report of PCT/JP2007/054033.

* cited by examiner

SURGICAL OPERATION TRAINING DEVICE

CROSS REFERENCE TO RELATED APPLICATIONS

This application is a continuation-in-part of U.S. patent application Ser. No. 12/920,871, filed on Feb. 14, 2011, which is a national phase application of PCT application No. PCT/JP2007/054033, filed on Mar. 2, 2007, which claims priority from Japanese Patent Application Serial No. 2006-057195, filed on Mar. 3, 2006. The entire disclosure of the aforesaid application is incorporated herein by reference.

FIELD OF THE INVENTION

The present invention relates to surgical training devices and more particularly, assuming cardiac surgery operations during heart pulsations, a surgical operation training device for performing training of various treatments such as anastomoses, ligations, cutting, etc. with respect to biotissues in moving states.

BACKGROUND OF THE INVENTION

Arteries referred to as coronary arteries are set up around the human cardiac muscles. When these coronary arteries are constricted or blocked up due to arteriosclerosis, etc., a myocardial necrosis referred to as myocardial infarction occurs. As a treatment for such constrictions or blockage of coronary arteries, coronary artery bypass surgeries are performed to newly secure alternate pathways in the coronary arteries, to divert around the constricted, blocked portions of the blood vessels.

At the time of such coronary artery bypass surgeries, artificial cardiopulmonary devices that support the patient's blood circulation condition are frequently used, because the patient's heart is stopped once in order to make the performance of the surgery easier. However, when using such artificial cardiopulmonary devices, there have been cases of postoperative cardiac function failures or postoperative brain disorders, etc. accompanying variations in blood flow. Thus, it is desirable to perform such surgeries while the patient's heart is beating, without using such artificial cardiopulmonary devices.

However, because the heart is in a beating state at such times, the management of cutting or anastomoses, etc. regarding the coronary arteries set up around the heart muscles is very difficult, and the physician is required to have very high surgical skills. In other words, cardiac surgeries performed without stopping the patient's heart requires proficiencies of the physician, and the physician needs to have performed sufficient training.

Incidentally, a surgical training simulator has been proposed for conducting training for surgical operations on beating hearts, as disclosed in Japanese Unexamined Patent Application Publication No. 2005-202267. With this simulator, through the rotations of a motor, an undulating means arranged inside a simulated heart eccentrically rotates through a transfer mechanism connected with this motor, and causes a beating of the surface of the simulated heart. However, this simulator has a construction where the surface of a simulated heart beats through the eccentric rotations of an undulating means. Thus, the variations of this surface have a deficient, comparatively simple beating motion.

With actual heartbeats in a human body, the heart surface moves in a complex manner, and such movements differ depending on a patient's condition, etc. In order to reproduce such movements in said simulator, the motor, the transmission mechanism connected to this motor and the undulating means must be further increased, and each undulating means must operate independently. In this case, the mechanisms including the motors, etc. become complex and larger-scaled, so that an upsizing of the overall apparatus accompanying an increased parts count is caused, and manufacturing cost is increased.

The present invention has been originated for taking aim at this type of problem. The objective is to provide a surgical operation training device for moving in a desired manner a simulation object that is the subject of the training, with a comparatively simple construction and without using a motor.

SUMMARY OF THE INVENTION (1) A surgical operation training device, having a covered treatment object for movably holding a training object body to which is applied a predetermined treatment at the time of a surgical operation training; a control unit for controlling a movement of the training object body; a movement mechanism for linking, respectively movably, a member at a predetermined region side with a member at a training object body side, in order to make the predetermined region movable with respect to the training object body; and a connecting member connected between each of the members, wherein the connecting member is formed of a shape memory material able to contract with respect to an original shape when an electric current flows through the connecting member, and the control unit further comprises a drive signal generating means for supplying the electric current at a predetermined timing to the connecting member, and wherein the drive signal generating means performs a movement control of the movement mechanism in accompaniment with varying a shape of the connecting member through varying a supply condition of the electric current to the connecting member.

(2) According to another aspect of the invention, a biasing means is provided between the member at the predetermined region side and the member at the training object body side, to bias the connecting member in a direction of extension.

(3) According to another aspect of the invention, the surgical operation training device further has a case able to accommodate the covered treatment object, wherein the case is arranged such that the covered treatment object is accessible from above.

(4) According to still another aspect of the invention, the surgical operation training device further has an operative area dimension adjustment mechanism at an upper portion of the case, to make adjustable an opening planar dimension at the upper portion.

(5) According to yet another aspect of the invention, a balloon object that is expandable-contractible according to an internal fluid volume is installed at a side wall portion of the case, and a fluid is supplied from an outside of the case to an inside of the balloon object.

(6) In still another aspect of the invention, a height of the training object body is arranged to be adjustable.

(7) In another aspect of the invention, the covered treatment object further has a mechanism wherein a position of the training object body is changeable and the training object body is fixable at a desired position.

(8) It is embodied in another mode of the invention a surgical operation training device, having a training object body to which is applied a predetermined treatment at the time of a surgical operation training; a holder for holding this training object body; a support for movably supporting this holder; a connecting member for connecting the holder and the support; and a control unit for controlling a movement of the holder, wherein the connecting member is formed of a shape memory material able to contract from an original shape when an electric current flows through the connecting member, and the control unit further comprises a drive signal generating means for supplying the electric current at a predetermined timing to the connecting member, and wherein the drive signal generating means performs a movement control of the holder in accompaniment with varying a shape of the connecting member through varying a supply condition of the electric current to the connecting member.

(9) It is embodied in still another mode of the invention, that the drive signal generating means applies to the connecting member a supply voltage of a predetermined waveform.

(10) It is embodied in yet another mode of the invention that the supply voltage has a pulse wave, and the drive signal generating means is arranged such that a duty cycle of the pulse wave is adjustable.

With the arrangement of the above-mentioned (1) to (8), by using the deformations of the connecting members through the supply of electric current to the connecting members, the training object body can be moved without using motors. Here, by variously selecting the connecting states of the connecting members, and through controlling, independently, the supplying of electric current to the relevant connecting members, complex movements can be provided to the training object body. By doing so, complicated movements of the heart surface in accordance with various kinds of conditions of disease states, etc. can be simulated.

In doing so, because the handling can be accomplished by adjusting program modules and/or processing circuits for controlling the electric current flows, the training object body can be made to have various complex movements via a simple construction without using a motor or its transfer mechanisms. Thus, downsizing of the overall system through reductions in the number of parts and cost-savings can be realized.

With the arrangement of the above-mentioned (2), when the supply of electric current to the connecting members is stopped or reduces, due to the biasing means, a restoration of the training object body to an initial state is assisted, and tempered movements of the training object body can be realized.

With the arrangement of the above-mentioned (3), the interior space of the case can be made equivalent to a chest cavity, and the trainee can do surgical operation training under conditions closer to surgical operations in actual conditions.

With the arrangement of the above-mentioned (4), the supposed operative area planar dimensions can be discretionally changed, and the restriction conditions when using surgical instruments can be freely set.

With the arrangement of the above-mentioned (5), the behaviors of the internal organs surrounding the region of the training object body can also be simulated. Thus, a visually realistic sense due to the respective motions of the relevant internal organs' behaviors and the movements of the training object body, can be provided to the trainee, and one can come closer to the conditions of actual surgical operations.

With the arrangement of the above-mentioned (6), the distance from the top of the case to the training object body inside can be changed, and surgery training becomes possible, regarding various internal organs or tissues, etc. that have different distances from the body surfaces. Thus, the present surgical operation training device has versatility.

With the arrangement of the above-mentioned (7), even when using a training object body with a simple form, by changing the positioning of the relevant training object body, surgery training for treatments having different postures can be performed, such as for surgeries on surfaces of the heart or surgeries on regions on the same side of the body. Without preparing training object bodies that approximate the actual forms of internal organs, effective training adapted to actual surgical operations can be performed.

With the arrangement of the above-mentioned (9), reiterations of movements, etc. of the training object body and complex movements of the training object body can be realized. Also, by adjusting the magnitudes of the supply voltage, the contraction amounts of the connecting members can be adjusted, and the magnitudes of the movements of the training object body can be changed.

With the arrangement of the above-mentioned (10), by changing the duty cycles of the pulse waves, the contraction timing of the connecting members is adjusted, and the movement speeds of the training object body can be changed.

DETAILED DESCRIPTION OF THE INVENTION

In the following, an embodiment of the present invention will be described with reference to the accompanying, exemplary drawings.

Figure 1:
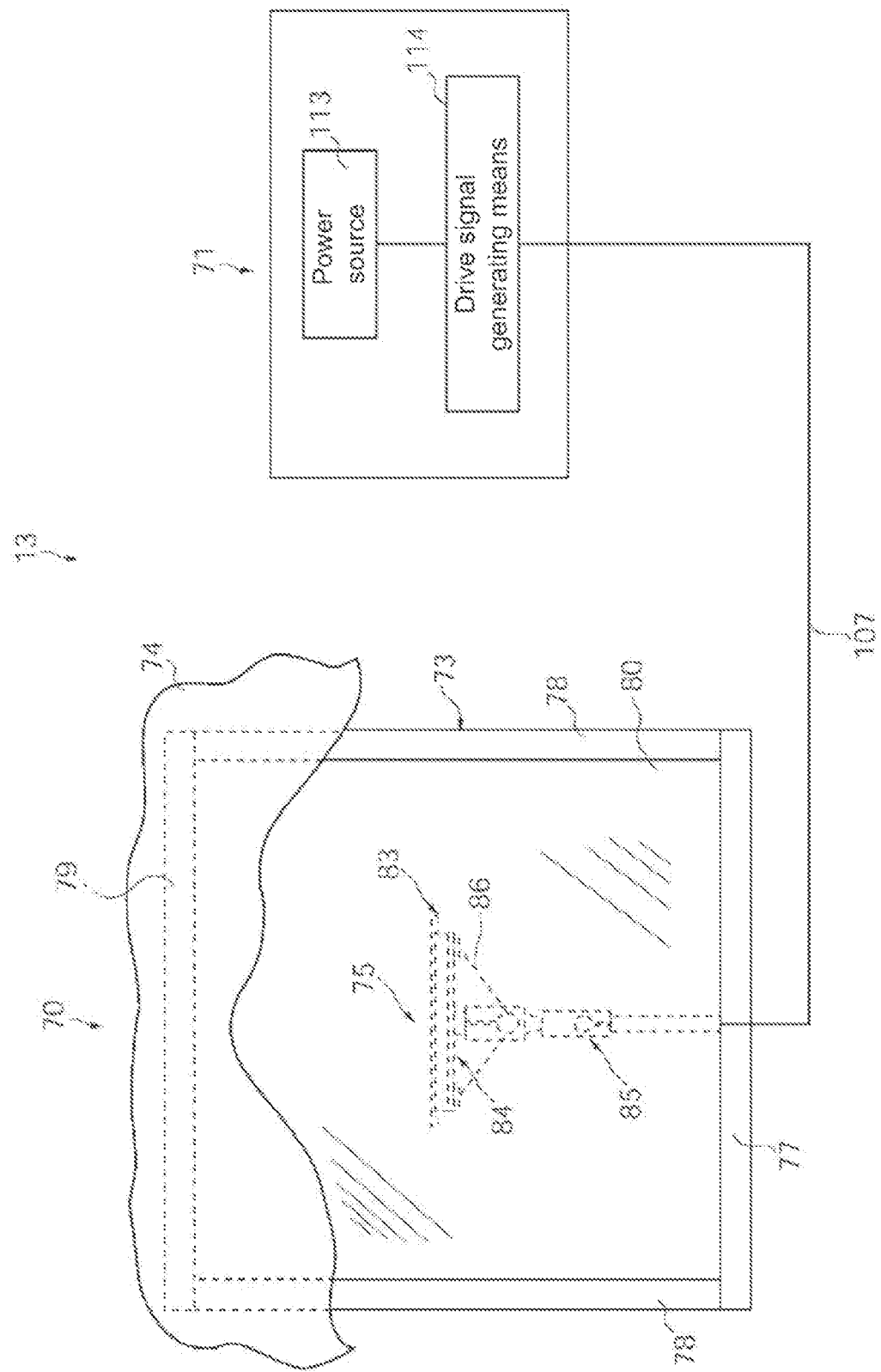
FIG. 1 is an outline construction view of a surgical operation training device of the present embodiment.

FIG. 1 shows an outline construction drawing of a present embodiment of the surgical operation training device. In this figure, a surgical operation training device 13 is constructed having a training unit 70 for a trainee such as a physician or a medical student, etc. to perform surgical operation training, and a control unit 71 for performing movement control of a training part of the training unit 70.

The above-mentioned training unit 70 has a cube-type case 73 with an upper portion open, a sheet 74 covering the upper portion of the case 73, and a covered treatment object 75 disposed within the case 73 that is equivalent to the affected part.

Figure 2:
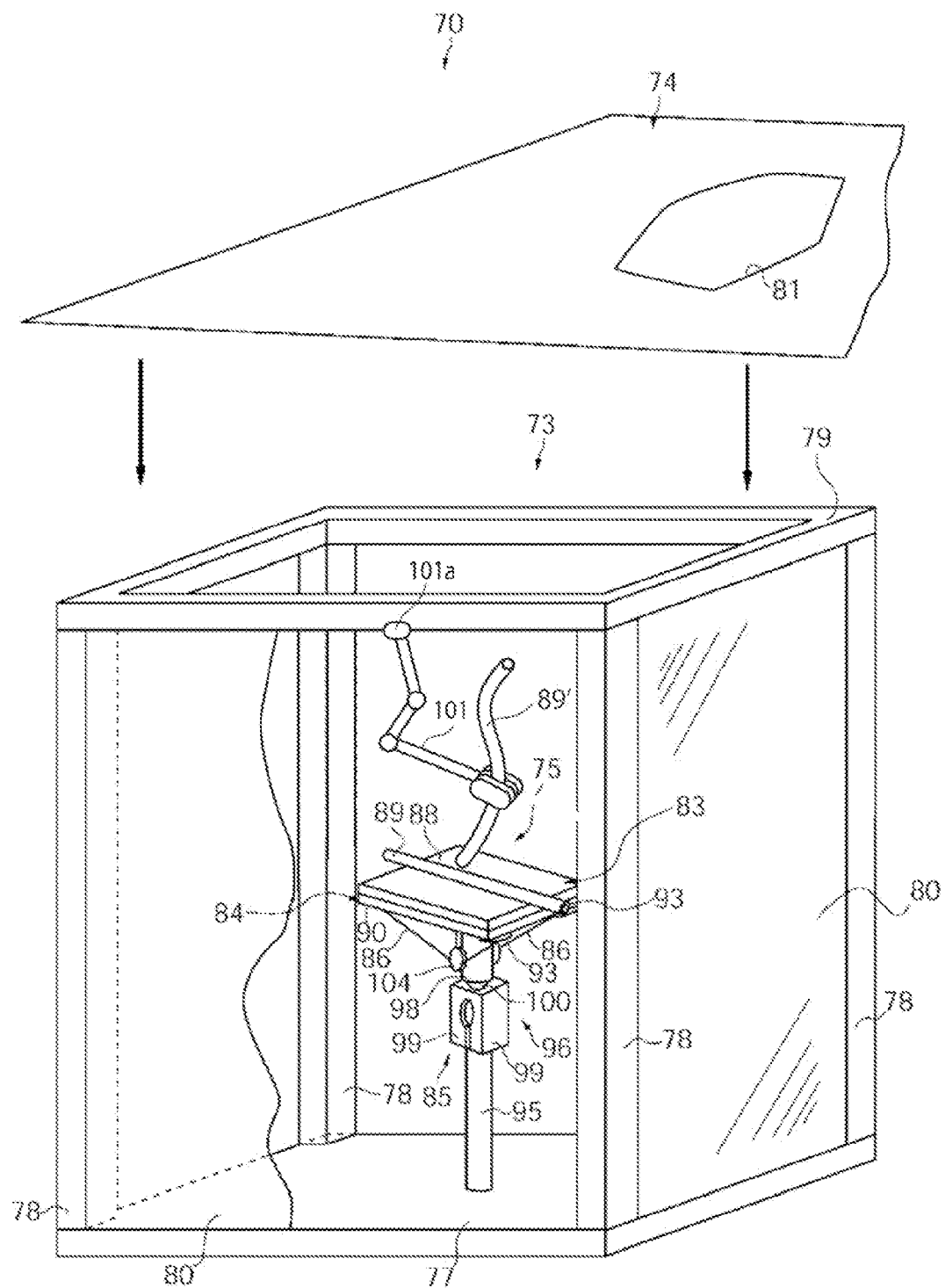
FIG. 2 is an outline perspective view of the training unit.

The above-mentioned case 73 is provided such that its inner spatial area is equivalent to a chest cavity. As shown in FIG. 2, the case 73 is constructed of a base 77 of an approximately rectangular shape at a planar view for supporting the covered treatment object 75 from below, posts 78 of an approximately square shape arranged standing at the four corners of the base 77, a frame 79 of an approximately rectangular frame shape at a planar view connected between the upper end portions of these posts 78, and side walls 80 having translucency and formed from acrylic boards, disposed between each of the posts 78, which become the sides of the case 73.

The above-mentioned sheet 74 should be a member equivalent to a skin portion of the human body, and it is formed of rubber, such as latex, etc., having a predetermined elasticity. A cut hole 81 that simulates a cutaneous incision site is formed approximately centrally in the sheet 74. When the sheet 74 covers the upper portion of the case 73, the trainee can access from the outside area above the case 73, through the cut hole 81, the covered treatment object 75 in the interior. Further, this sheet 74 is fixed to the frame 79 via a fixture not shown in the drawing.

As shown in FIG. 1, the above-mentioned covered treatment object 75 is constructed of simulation body 83 on which a predetermined treatment is administered at the time of the surgical operation training, a holder 84 for holding this simulation body 83 from below, a support 85 for movably supporting this holder 84, and a wire 86 as a connecting member for connecting the holder 84 and the support 85.

Figure 3:
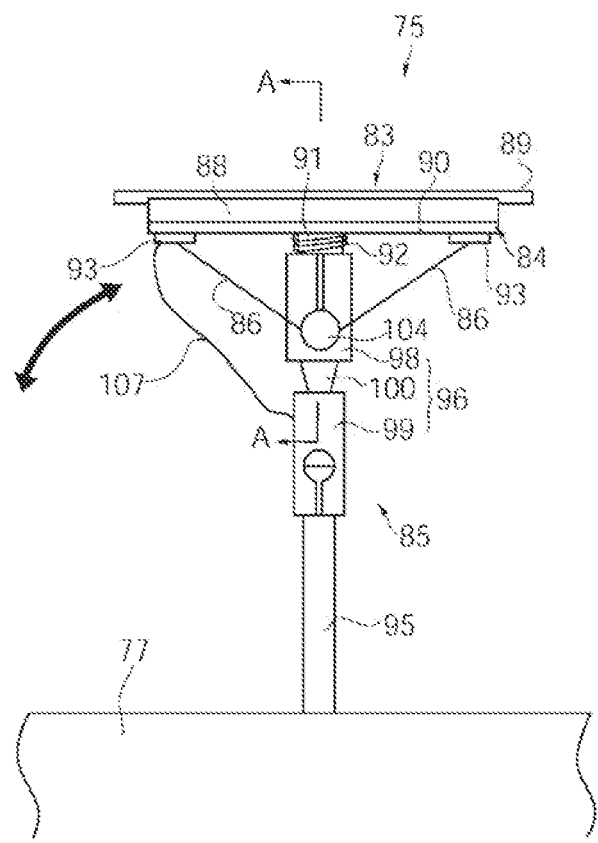
FIG. 3 is an outline, front elevational view of the covered treatment object.
Figure 4:
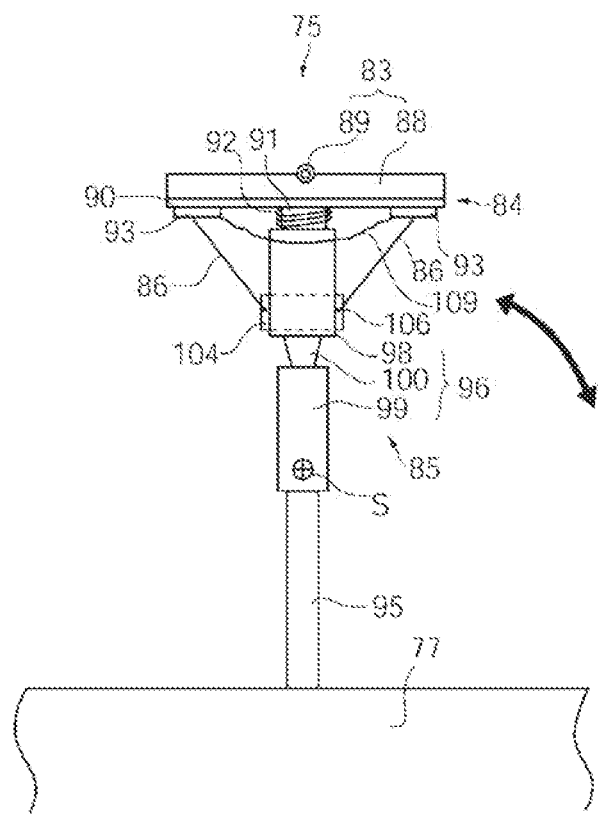
FIG. 4 is an outline, side elevational view of the covered treatment object.

The above-noted simulation body 83 is formed to simulate one part of a biotissue that is the training object. In the present embodiment, as shown in FIGS. 2-4, it is formed of silicone, etc. to simulate one portion of a heart surface in which coronary arteries are expressed. This simulation body 83 comprises a simulation myocardium 88 of approximately a right-angled parallelepiped shape, and a simulation blood vessel 89 that is fixed approximately centrally in the shorter-width direction, at the top surface side of the simulation myocardium 88 and that extends along a longitudinal direction of the simulation myocardium 88.

This device also has a retention clip member 101 which retains another simulated blood vessel 89' so that one end thereof is positioned opposite to the midway of said simulated blood vessel 89. The midway portion of said retention clip member 101 is formed to be flexible so as to allow positioning said simulated blood vessel 89' in all directions and at the same time it has its base end part 101a fixated to the frame 79 of said case 73.

The holder 84 is constructed as being provided with a holder plate 90 installed at a bottom surface side of the simulation myocardium 88, an approximately cylindrical-shaped, middle projection 91 projecting downwardly from a central portion of a bottom surface side of the holder plate 90, a coil spring 92 as a biasing means installed on the middle protrusion, and approximately cylindrical-shaped corner projections 93 at a bottom surface of the holder plate 90 and projecting downward from the 4 points at each corner side of the holder plate 90.

The above-mentioned holder plate 90 is not limited in particular, but it has approximately the same planar shape as the simulation myocardium 88. The holder plate 90 allows the installation of the simulation body 83 in a freely attachable-detachable manner and also, at the time of such installation, allows the fixing of the simulation body 83, in a non-displaceable manner with respect to each other.

Figure 5:
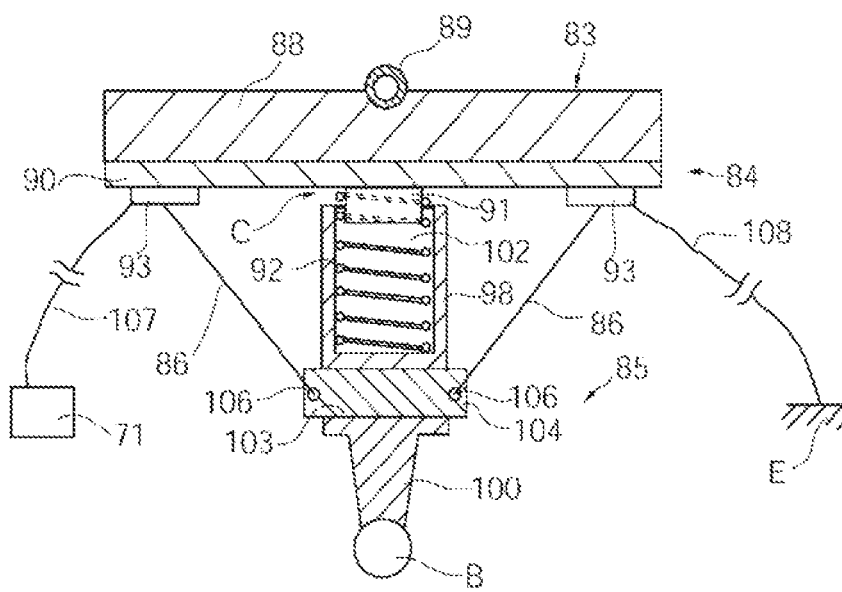
FIG. 5 is a sectional view along line A-A of FIG. 3.

The above-noted coil spring 92 is, as shown in FIG. 5, has a top end portion wound around and fixed at a circumference of the middle projection 91. In the initial state of FIG. 5, the coil spring 92 is set at a length such that it extends downward from the middle projection 91, and it is adapted to bias the holder plate 90 upward in FIG. 5. Furthermore, in the present embodiment, a coil spring 92 is used, but that can be replaced with other biasing means such as springs or rubber, etc., as long as the below-described operations can be performed.

At each above-noted corner projection 93, the above-mentioned wire 86 is installed. Although they are not limited in particular, the height of each corner projection 93 is set to be lower than the middle projection 91.

As shown in FIGS. 2-4, the above-noted support 85 is constructed to comprise a cylindrical bar-shaped leg member 95 that is freely attachable-detachable to and arranged in a standing position relative to the base 77, and a universal joint 96 connecting the above-mentioned holder 84 and the leg member 95.

The above-mentioned universal joint 96 makes the position of the simulation body 83 variable and moreover, can lock that simulation body 83 in a desired position. In other words, the universal joint 96 has an upper side member 98 to which the above-noted holder 84 can be installed, a lower side member 99 to which the leg member 95 can be installed, and a middle member 100 which, extending from a bottom end side of the upper side member 98, connects the upper side member 98 to the lower side member 99 such that the upper side member 98 is rotatable and able to pivot at a neck, all around, with respect to the lower side member 99.

As shown in FIG. 5, the above-mentioned upper side member 98 is provided with a bottomed cylinder shape with an upper end side opened, a receptacle 102 for receiving the above-mentioned coil spring 92, a through hole 103 penetrating through a lower position of this receptacle 102 in a diametrical direction, and an axle member 104 insertably passing through the through hole 103.

The above-noted receptacle 102 has the lower end portion of the coil spring 92 placed at its lower part, and is set at a depth so that in the initial state of FIG. 5 in which the device is not in operation, the upper part of the coil spring 92 is able to present outward. Thus, in the above-mentioned initial state, a differential gap C is produced between a lower surface of the holder plate 90 and a top end of the upper side member 98.

The above-noted axle member 104 is set to be longer than an external diameter of the upper side member 98, and its is placed and fixed so that both its end sides in the lengthwise direction (the left-right end sides in FIG. 5) project outwardly from the upper side member 98. At these projection portions, small holes 106 have been made for the wires 86 to pass through. As described below, the small holes 106 are made such that the above-mentioned wires 86 are insertably passed through them.

As shown in FIGS. 2-4, the above-noted lower side member 99 is made to have the upper part of the leg member 95 insertable to its inside from its lower end side. With the fastening of a screw S (refer to FIG. 4), the lower side member 99 is made to be fixable to the leg member 95. Here, by selectively using leg members 95 of different lengths, the overall height of the support 85 can be varied. Stated in another way, through the selection of the leg member 95, the distance from the upper end side of the case 73 (refer to FIG. 2) to the simulation body 83 can be varied, and training is enabled assuming surgical operations for internal organs, etc., each type having different distances from the body surface.

The above-mentioned middle member 100 is provided so that with spherical member B (refer to FIG. 5) at its lower end side as a rotational center, the upper side member 98 can rotate with respect to the lower side member 99 in the direction of the arrow in FIGS. 3 and 4. Here, through clamping down on a screw (omitted in the drawings) at an outside circumference side of the upper side member 98, an angle of the upper side member 98 to the lower side member 99 can be fixed to a desired value.

Because this upper side member 98 is connected to the simulation body 83 and the holder 84 through the coil spring 92, the posture of the simulation body 83 changes following the posture of the upper side member 98. Thus, depending on the subject of the training, the angle of the upper side member 98 with respect to the support 85 can be changed and the training can be performed. For example, when performing anastomosis training of a coronary artery at the front part of a heart, the front surface of the simulation body 83 is set to face approximately horizontally, and when performing anastomosis training of a coronary artery at a side part of a heart, the front surface of the simulation body 83 is set to face at a slant.

Further, although not limited in particular, from the simulation blood vessel 89 of the simulation body 83 to the rotational center of the middle member 100, namely the spherical member B, is set at 40 mm-45 mm.

Figure 6:
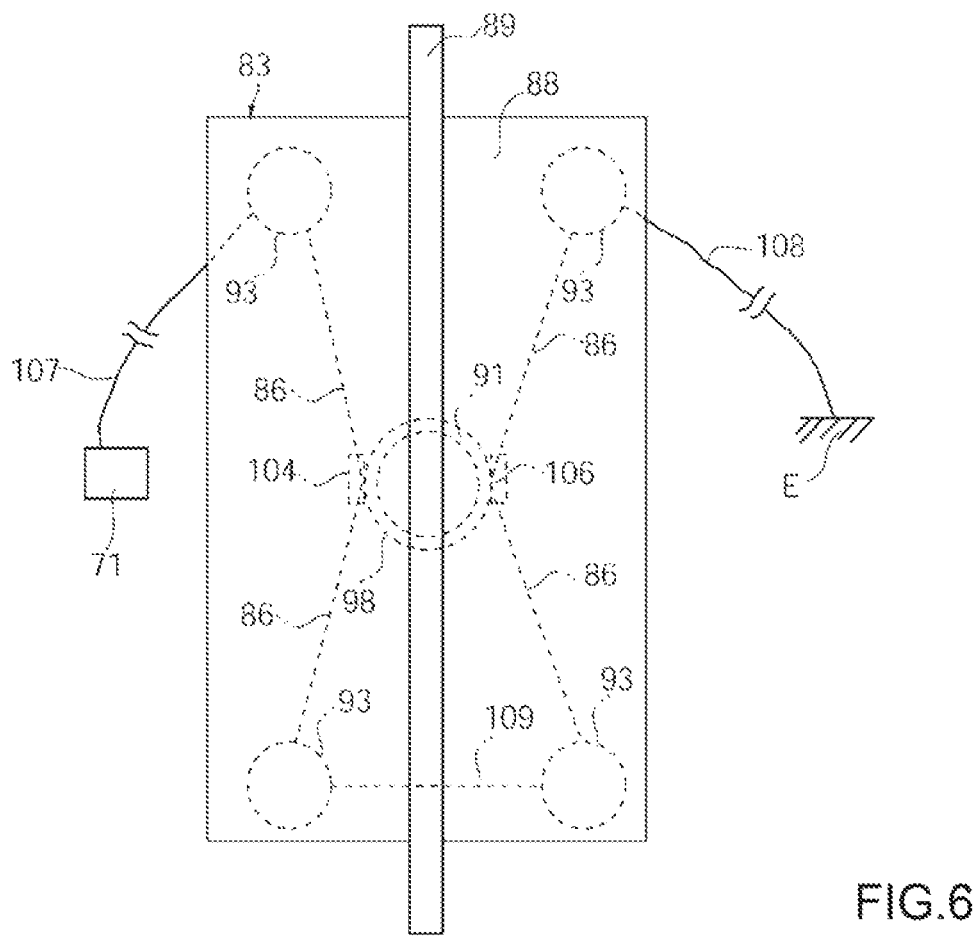
FIG. 6 is an outline, top plan view of the covered treatment object.

The above-noted wire 86 is, for example, as disclosed in Japanese Unexamined Patent Application Publication Nos. 2005-193583 and S57[1982]-141704, etc., formed of a shape memory alloy of the Ti—Ni or Ti—Ni—Cu type, etc., which is able to contract from heat generation when electric current flows through it. This wire 86 is arranged in two strands and, as shown in FIG. 6, one strand insertably passes through small hole 106 of the axle member 104, from the corner projection 93 at the upper left of that drawing, and extends to the corner projection 93 at the lower left of that drawing. The remaining other strand insertably passes through small hole 106 of the axle member 104 from the corner projection 93 at the upper right of the same drawing and extends to the corner projection 93 at the bottom right of that drawing.

An end part of the wire 86 installed at the corner projection 93 at the upper left of FIG. 6 is connected to inlet side electrical wire 107, in which electric current controlled by the control unit 71 flows. Also, an end part of the wire 86 installed at the corner projection 93 at the upper right of FIG. 6 is connected to an outlet side electric wire 108 leading to earth (ground) E.

Further still, a connecting electric wire 109 is connected between the end parts of wires 86, 86, installed at each of the corner projections 93, 93 at the bottom left and the bottom right of FIG. 6. Accordingly, the two wires 86, 86 are electrically connected in series, and the current from the control unit 71 side goes from the wire 86 placed at the left side of FIG. 6, through the wire 86 placed similarly at the right side and flows to earth E.

Also, at the above-mentioned initial state, these wires 86, 86 are set in a tensioned condition, in a state of being given a predetermined tensile force, at each corner projection 93. Furthermore, although not limited in particular, although the inlet side electrical wire 107 and the outlet side electrical wire 108 are shown partly in FIGS. 1, 3 and 5, they are made to be able to go through an interior space of the support 85 and go from the base 77 to the outside of the case 73.

As shown in FIG. 1, the above-noted control unit 71 is provided with a power source 113 and a drive signal generating means 114 for supplying the electric current from this power source 113 at a predetermined timing to the wire 86. This drive signal generating means 114 varies the supply condition of the electric current to wire 86, and repeats the contraction and the restoration to the original shape of the wire 86. Thus, the operational control of the holder 84 which has been integrated with the simulation body 83 can be performed. In concrete terms, control unit 71 is constructed as a device that can supply to the wire 86 a predetermined waveform of a supply voltage, set beforehand. Although omitted from the drawings, it is constructed of devices commonly known in the art such as function generators, etc. of signal generators and amplifiers, etc.

Also, the drive signal generating means 114 is adapted to be able to control the output waveforms of the duty cycle or the supply voltage to a desired state. In the present embodiment, although not limited in particular, a pulse wave (rectangular wave) is used as the output waveform, the frequency is set at any of the values within 0.5 Hz-2 Hz, and the duty cycle is set to around 10%. Note that a computer may be used in place of the signal generator and amplifiers, and also, other waveforms such as sine-waves, etc. may be used, rather than just pulse waves, as the output waveform.

Next, the operation of the above described surgical operation training device 13 will be described with reference to the accompanying, exemplary FIGS. 1-5.

First, as a preparation before the training, a leg member 95 of a desired length is selected, that corresponds to a region that is the subject of the training. This leg member 95 is attached to the base 77 and the lower side member 99. Then, corresponding with the region that is the subject of the training, the upper side member 98 is pivoted at a neck and rotated with respect to the lower side member 99, and the upper side member 98 is fixed at a desired angle, to position the simulation body 83 at a desired posture. And, by throwing a switch not shown in the drawings, an electric current is supplied from the control unit 71 to the wires 86, and the electric current is supplied to the wires 86 in ON-OFF states at a predetermined timing.

Here, when the electric current is supplied, through the above-described characteristic of the wires 86, those wires 86 contract. Accompanying this, a downward pulling tension occurs with respect to the holder plate 90, which is integrated with the corner projections 93 to which the wires 86 are attached. In doing so, in accompaniment with the compression of the coil spring 92 that is installed on the middle projection of the holder plate 90, the holder plate 90 and the simulation body 83 move downward from the above-mentioned initial position.

On the other hand, when the electric current supply is stopped, the wires 86 that remember their shapes extend so that they are restored to their original length. Accompanying the restoration of the coil spring 92, the holder plate 90 and the simulation body 83 move upward and return to the above-mentioned initial positions. In other words, because the supply voltage is applied to the wires 86 from the control unit 71 as a pulse-shaped waveform, the simulation body 83 and the holder 84 move up-down within the range of the above-mentioned differential gap C (refer to FIG. 5) in a distancing-approaching manner with respect to the support 85.

By assuming this condition to be the beating condition of a heart, the trainee can insert his hands through the cut hole 81 of the sheet 74 and with respect to that simulation blood vessel 89, anastomose other simulation blood vessel(s), etc., and perform the training for various treatments relating to coronary artery bypass surgeries.

Here, when the size or the duty cycle of the supply voltage is changed via the control unit 71, the beating condition of the simulation body 83 can be varied. For example, when the supply voltage is lowered, the heating of the wires 86 is reduced and in accompaniment, the contraction amount (distortion) of the wires 86 is also decreased, thus enabling the production of a beating condition of a small magnitude. Also, when the duty cycle is decreased, the time period for the supply of the electric current to be OFF is increased, thus enabling the production of a beating condition at a slow motion.

Thus, according to such an embodiment, the holder 84 and the support 85 act as a movement mechanism that link, in a respectively movable manner, the holder plate 90 at the simulation body 83 side with the upper side member 98 at the support 85 side, in order to make the simulation body 83 movable. Accordingly, with a simple configuration without using a motor, etc., a result is obtained in which the simulation body 83 is moved and a beating condition of the heart surface is simulated.

Additionally, in the above-noted embodiment, in order to simplify the explanation, the configuration is made to allow an implementation of the most simple, single degree of freedom (up-down motion) operation. However, more wires 86 can further be used and the locations for installing those wires 86 on the holder plate 90 can be adjusted, as well as making the contraction and restoration of each of the wires 86 independent by permitting the electric current supply with respect to each of the wires 86 to be independently controlled, and allowing the implementations of various operations such as linear-motions, rotational motions and/or twisting motions, etc. of the simulation body 83 and the holder 84. In this case, because it is sufficient to arrange the control unit 71 through a plurality of program modules and/or processing circuits, drive devices of motors, etc. or the coexistence of many such drive mechanisms as in the past are no longer necessary. With a simple configuration, complicated movements of the simulation body 83 can be provided.

Figure 7:
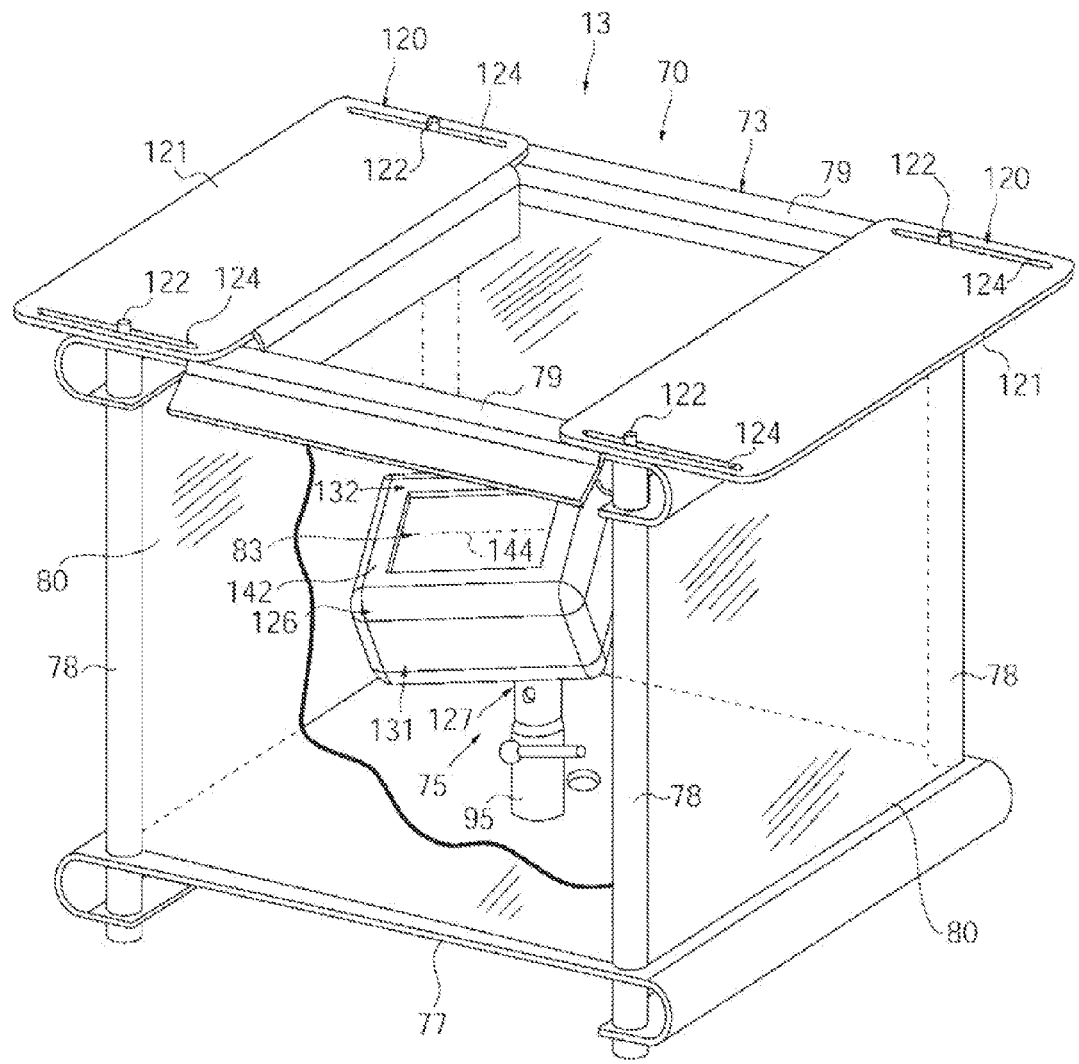
FIG. 7 is an outline, perspective view of the training unit of an exemplary variation.

For example, as one example of a variation of the present embodiment, there is as shown in FIG. 7 a surgical operation training device 13 in which the simulation body 83 is made independently movable in the three orthogonal axes directions. Also, in the below explanation of the present example modification, the same reference numerals are used for the configuration portions that are similar or the same, etc. as the above-described embodiment. In order to abbreviate and simplify the explanation, only the configuration aspects or operations that differ from the above-described embodiment will be explained.

With the surgical operation training device 13 of the present exemplary modification, rather than having a sheet 74 (refer to FIG. 1) covering the upper portion of the above-mentioned case 73, an operative area dimension adjustment mechanism 120 is provided for allowing adjustment of the opening planar dimensions at the upper portion of the case 73.

In order to change the above-mentioned opening planar dimensions for which the operative area is envisaged, this operative area dimension adjustment mechanism 120 has door plates 121, 121 disposed at both left-right sides and pins 122 for supporting the door plates 121, which project upward from the four corner positions of the above-mentioned frame 79, disposed at the upper portion of the case 73.

The above-mentioned door plates 121, although not limited in particular, are formed in approximately rectangular shapes with, on the one hand, the width in the front-back direction being approximately equal to the width of the frame 79 in that same direction, while the width in the left-right direction is about half the width of the frame 70 in that same direction. Each door plate 121 has, at the front-back end sides, slot apertures 124 through which the pins 122 penetrate. Each door plate 121 can slide along the extending direction (left-right directions) of the slot apertures 124, and each door plate 121, 121 can freely separate-approach in the left-right directions. Accordingly, envisaging that the field of view from the opening portion formed between each door plate 121, 121 to inside the case 73 is the operative area, the assumed operative area dimensions can be discretionally changed by adjusting the separation width between each door plate 121, 121. Thus, the restriction conditions when using surgical instruments such as needle-holders or tweezers (pin sets), etc. can be freely set.

Further, although omitted from the drawings, an expandable-contractible balloon object according to the fluid volume of the interior can be installed at a portion or at the entirety of the side walls 80. This balloon object is set to simulate internal organs surrounding the heart within the chest cavity, such as the diaphragm or the lungs, etc. Although not limited in particular, it can be formed from elastic materials such as polyurethane, silicone resins, etc. At the inside of the above-mentioned balloon object, gases or fluids are supplied and discharged with respect to the outside of the case 73, and by thus discretionally controlling the atmospheric pressure or the fluid pressure, the behavior of the above-mentioned internal organs can be simulated.

In other words, since the diaphragm or the lungs move repeatedly within a predetermined scope according to respiration, when a trainee is performing the training, a visually realistic sense that is close to the conditions of an actual surgery can be given to the trainee. That is to say, the respective movements among the beating behavior of the coronary arteries according to the simulation body 83, and the behavior of the internal organs within the chest cavity according to the balloon object can be simulated with a visually realistic sense. Also, by using a red liquid simulating blood as the fluid supplied to the interior of the balloon object, a visually realistic sense of the bleeding of the coronary arteries and the chest cavity interior can be given to the trainee.

Further still, although not limited in particular, the posts 78 of the present exemplary variation are in round bar form and are made to be freely attachable-detachable with respect to the base 77 and the frame 79. Thus, when carrying, etc. the surgical operation training device 13, the entire case 73 can be made to be compact.

The covered treatment object 75 of the present exemplary variation is constructed with the above-mentioned simulation body 83, a drive unit 126 enabled to independently move this simulation body 83 in the three orthogonal axes directions (x-axis, y-axis, z-axis), a universal joint 96 fixed to a lower end side of the drive unit 126 that makes the position of the simulation body 83 variable and, moreover, that can lock the simulation body 83 is a desired position, and the above-mentioned leg member 95 on which the universal joint 96 is installed.

Figure 8:
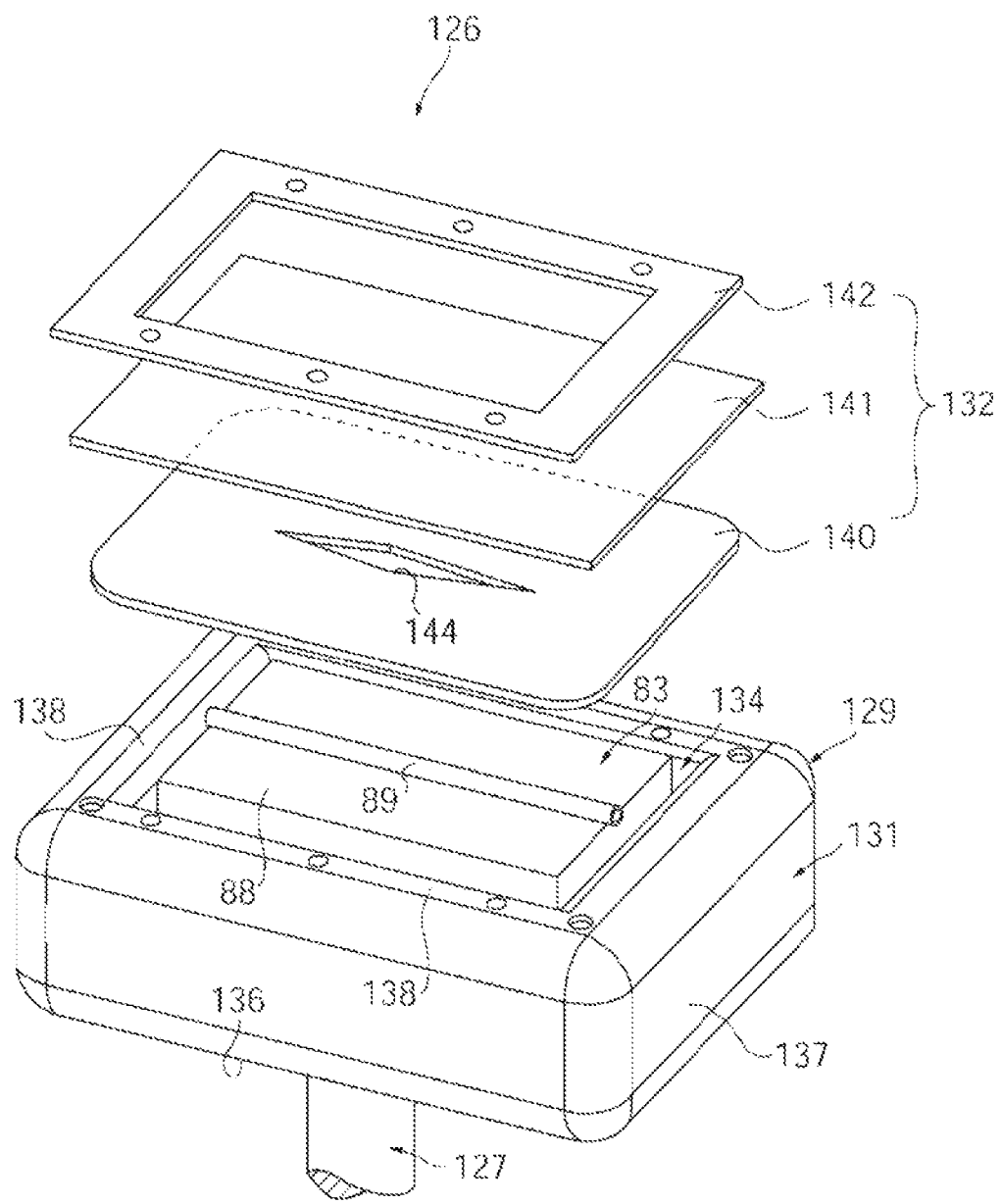
FIG. 8 is a partial, disassembled and enlarged, outline perspective view of the drive unit which is the upper portion of the covered treatment object.
Figure 9:
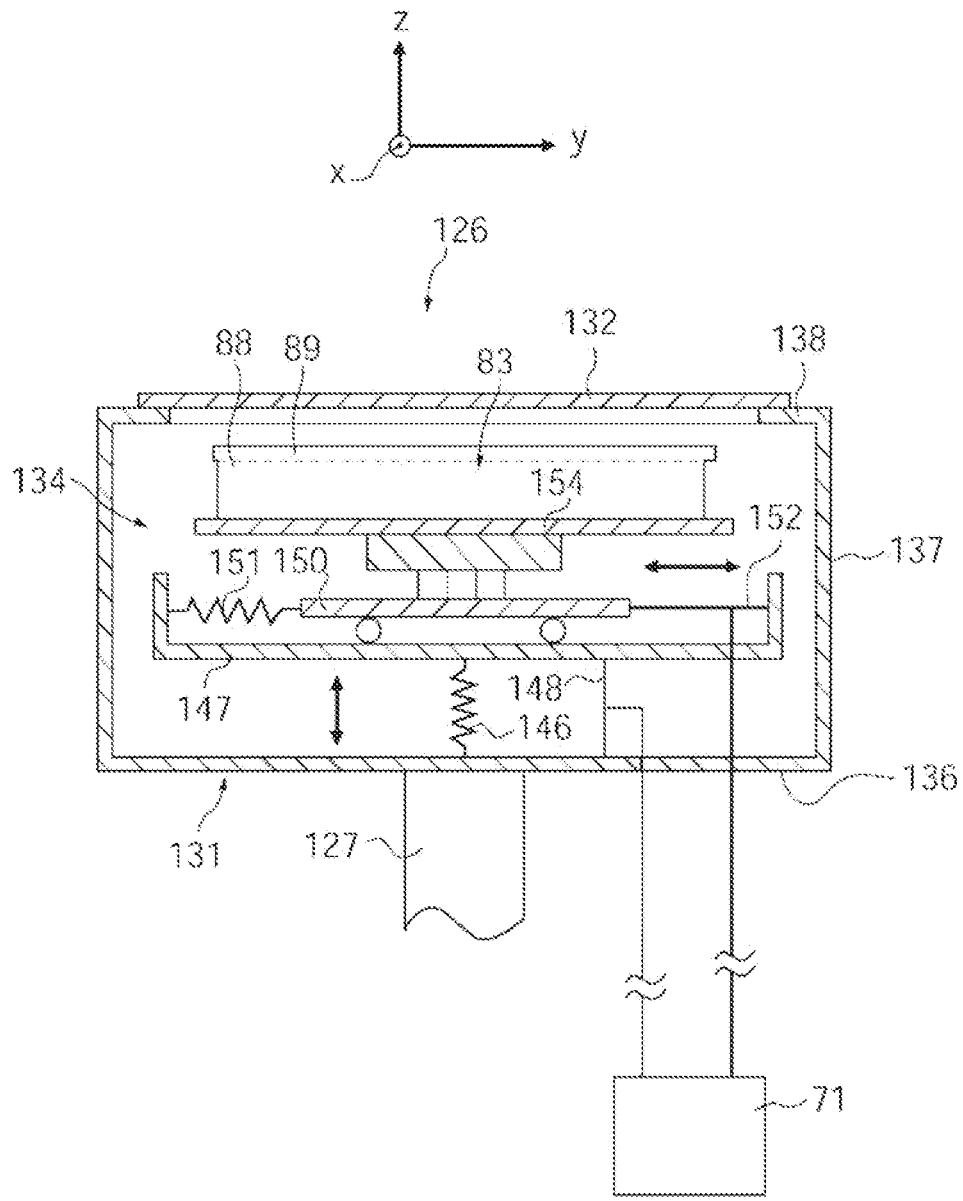
FIG. 9 is a conceptually shown, outline and sectional front elevational view of the drive unit.
Figure 10:
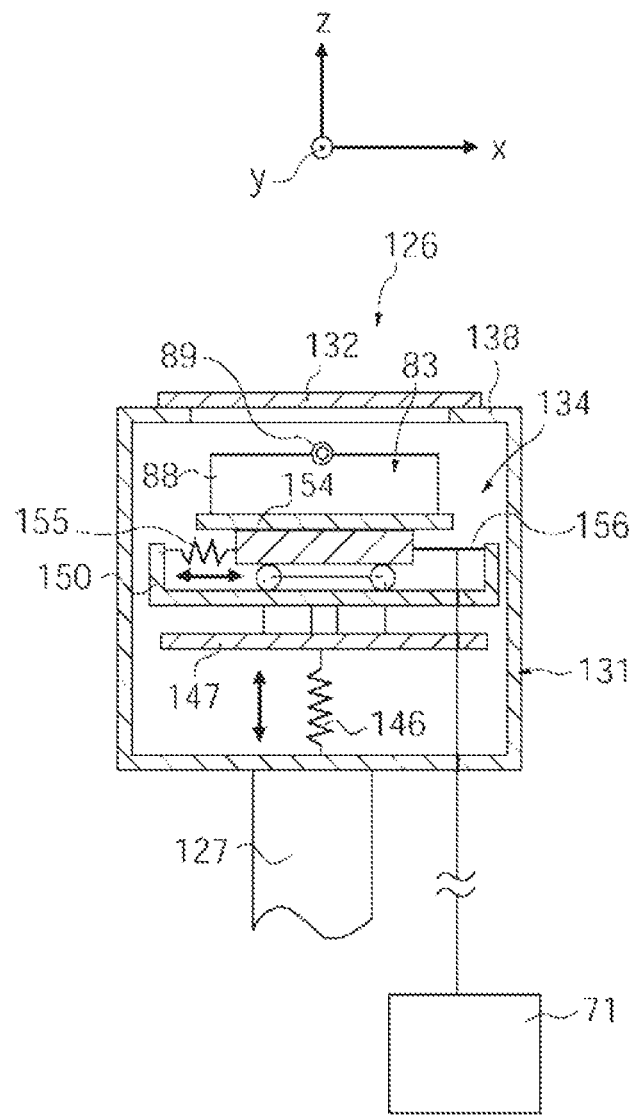
FIG. 10 is a conceptually shown, outline and sectional side elevational view of the drive unit.

As shown in FIGS. 8-10, the above-mentioned drive unit 126 is prepared with a holder 129 of a box-type having a top side as an opening portion and an inner spatial area, a covering unit 132 that covers the opening portion of this holder 129 from above, and a drive mechanism 134 arranged inside the holder 129 and that supports the simulation body 83 to be movable in the three orthogonal axes directions.

The above-mentioned holder 129 is prepared with a bottom wall part 136 having an approximately square shape at a planar view, a side wall part 137 standing along the periphery of this bottom wall part, and a rim part 138 bending in the inside direction from the top end side of the side wall part 137. The simulation body 83 and the drive mechanism 134 are housed in the inner spatial area surrounded by these bottom wall 136, side wall 137 and rim 138 parts, and they are made to be accessible from the opening portion at the inner side of the rim part 138.

As shown in FIGS. 9 and 10, the above-mentioned covering unit 132 is made to close and cover the above-mentioned opening portion, in a state of isolating a clearance gap with respect to the simulation body 83, and is placed to be freely attachable-detachable with respect to the holder 129. In other words, the covering unit 132 is, as shown in FIG. 8, constructed as being provided with a simulated fat sheet 140 (fat layer) made of resin that simulates the fat covering the coronary arteries of the heart, a simulated pericardium sheet 141 (pericardium layer) made of resin that is placed as layered at a top surface of this simulated fat sheet 140 along with simulating the pericardium, and a fixture plate 142 made of metal that is placed at a top surface of the simulated pericardium sheet 141 and that sandwiches and fixes each sheet 140, 141.

The above-mentioned simulated fat sheet 140 is made to have slightly larger planar dimensions than the above-mentioned opening portion. In a condition of being installed at the tight holder 129, in order to allow access to the simulation blood vessel 89 under it, the simulated fat sheet 140 has a cut 144 formed in it that extends in a direction along with that simulation blood vessel 89.

The above-mentioned simulated pericardium sheet 141, although not limited in particular, is made to have approximately the same planar dimensions as the simulated fat sheet 140.

The above-mentioned fixture plate 142 has a square frame-shape with peripheral dimensions that are approximately the same as the simulated fat sheet 141. By sandwiching each sheet 140, 141 between the rim part 138 of the holder 129 and screwing shut, it can cover the opening portion from above while each sheet 140, 141 is incapable of dropping down.

As shown schematically in FIGS. 9 and 10, the above-mentioned drive mechanism 134 is prepared with a z-axis stage 147 that is supported by a z-axis spring 146 connected to the bottom wall part 136 side and is movable in the up-down directions of those drawings (z-axis direction), a z-axis wire 148 connected between the bottom wall part 136 side and the z-axis stage 147, a y-axis stage 150 movable with respect to the z-axis stage 147 in the left-right direction (y-axis direction) of FIG. 9 and supported by the z-axis stage, a y-axis spring 151 and a y-axis wire 152 installed between the z-axis stage 147 and the y-axis stage 150, an x-axis stage 154 movable with respect to the y-axis stage 150 in the page orthogonal direction (x-axis direction) of FIG. 9, supported by the y-axis stage 150 and on which the simulated body 83 is placed, and an x-axis spring 155 and an x-axis wire 156 installed between the y-axis stage 150 and the x-axis stage 154.

Accordingly, each stage 147, 150, 154 constitutes a motion mechanism joined to make the simulation body 83 relatively movable with respect to the holder 129, and each wire 148, 152, 156 constitutes a connecting member between the holder 129 and each stage 147, 150, 154.

These wires 148, 152, 156 are, similarly to the above-described embodiment, formed of shape memory alloys that can contract when heat generation occurs from the flow of electric current. The electric current from the above-described control unit 71 is supplied to these wires 148, 152, 156 in a state where each is independently controlled. Each wire 148, 152, 156 is positioned such that, through the contracting at the time of the electric current flow of each wire 148, 152, 156, each stage 147, 150, 154 moves in each direction from predetermined initial arrangements.

Each of the above-mentioned springs 146, 151, 155 are arranged to function as biasing means such that when electric current is supplied to each wire 148, 152, 156 and each stage 147, 150, 154 connected to each relevant wire 148, 152, 156 moves, biasing occurs in the relevant movement directions and the opposing directions. In other words, it becomes possible for each spring 146, 151, 155 to bias each wire 148, 152, 156 in the direction of extension, so that when their supply of electric current is stopped, the corresponding stage 147, 150, 154 is returned smoothly to the initial arrangement. Note that, even for the present exemplary variation, as long as the operations performed are similar, other biasing means can be adopted to take the place of each spring 146, 151, 155.

As in the above, with the present exemplary variation, similarly to the above-described embodiment, by performing the repetition of the ON-OFF of the electric current supplied to each wire 148, 152, 156, the movement and the restoration of each stage 147, 150, 154 can be performed in independent repetition. Because of this, the simulation body 83 can be pulsed in the three orthogonal axes directions. By independently controlling the electric current supplied to each wire 148, 152, 156, innumerable patterns of beating conditions can be discretionally created. Thus, the perioperative restriction conditions can be set at states that are even closer to actuality.

Also, by providing the covering unit 132, the tissues around the coronary arteries such as fat, the pericardium, connective tissues, etc. can be simulated, surgical operation training that is even closer to actual conditions can be performed. In other words, because the pulsing of the coronary arteries occurs at a part under the fat layer and the pericardium layer, the operative area seen from the cut 144 which is the simulated incision opening becomes limited considerably, the degree of relative difficulty of the operative manual skill goes up, and operation training that is close to the clinical and effective can be performed.

Also, with the above-mentioned covering unit 132, the fat layer and the pericardium layer can be independently designed, and device development including them can become efficient.

Even more particularly, depending on the patients, the heart surfaces can be of various kinds. By preparing simulated fat sheets 140 and simulated pericardium sheets 141 of various properties and selecting each sheet 140, 141 to meet the fat and pericardium needed for the training, a variety of surgical field environments can be reproduced, and the needs of diverse trainees can be met.

Also, touch sensors or pressure sensitive sensors that are not shown in the drawings can be provided at the x-axis stage 154 on which the simulation body 83 is placed, etc., and the loads with respect to the simulation myocardium 88 accompanying the trainee's operative manual skill can be measured. In this way, the loads operating due to the operation training with respect to the simulation myocardium 88 are quantified, and this can be one objective evaluation of the training.

Figure 11:
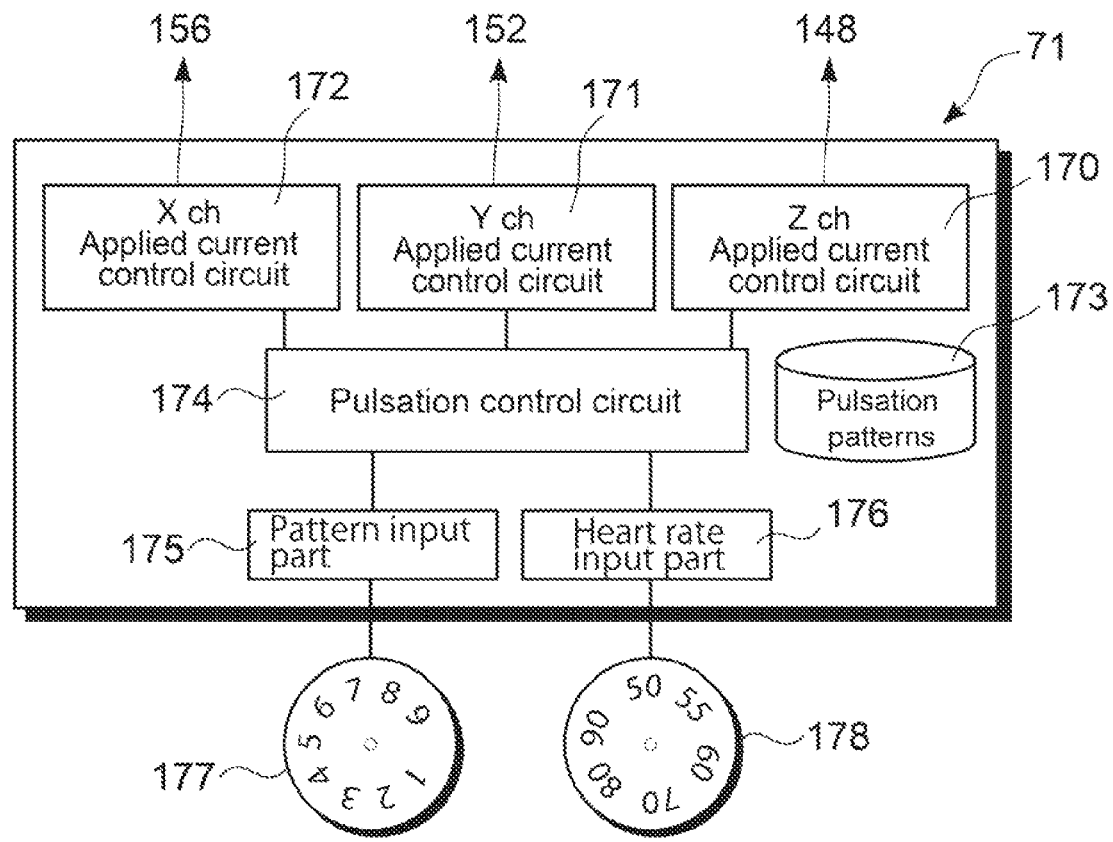
FIG. 11 is a schematic configuration view showing a controller.

FIG. 11 is a schematic configuration view of the controller 71 connected to the drive unit.

This controller 71 comprises Z, Y, and X applied current control circuits, 170, 171, and 172 that are connected to each of wires 148, 152, and 156, respectively, which wires are provided at said Z, Y, and X stages, 147, 150, and 154; a pulsation pattern memory part 173 that stores a pulsation pattern generated by a combination of currents applied to each of wires 148, 152, and 156 by each of these Z, Y, and X applied current control circuits; a pulsation control circuit 174 that gives control signals to each of said Z, Y, and X applied current control circuits, 170, 171, and 172, based on said pulsation pattern; a pulsation pattern input part 175 that inputs a selection of the pulsation pattern; and a heart rate input part 176 that inputs a selection of the heart rate.

The pattern that can be input from the pattern input part 175 is such that 9 patterns, 1 to 9, can be selected with a dial 177. Each pattern in this embodiment is determined by a combination of amplitude and lag time given to each of Y and X wires, 152 and 156. The amplitude is the movement distance in the YX directions of the simulated blood vessel 89, which is given by the expansion and contraction of Y and X wires, 152 and 156, and it is provided in three patterns, 0, 1, and 2 mm, in this embodiment. The lag time is a lag time in current timing given to Y and X wires, 152 and 156 on the basis of the Z wire 148, and it is provided in three patterns, 0%, 10%, and 20% in this example. Therefore, the pulsation patterns that can be selected are 3×3, 9 patterns, said patterns being selectable with the dial 177. In addition, the selectable heart rate is so provided to allow the dial 178 to specify non-stepwise from 55 to 90 beats per minute. All the wires 148, 152, and 156 are so provided to be driven at a duty ratio corresponding to the selected heart rate.

The above-mentioned pulsation control circuit 174 is provided such that when the user specifies the pulsation pattern and heart rate using said two dials, 177 and 178, it determines, on the basis of said stored pulsation pattern 73, the voltages of the current and the duty ratios to be given to said ZYX wires, 148, 152, and 156, whereby the pulsation is reproduced on the above-mentioned simulated blood vessel 89.

Figure 12:
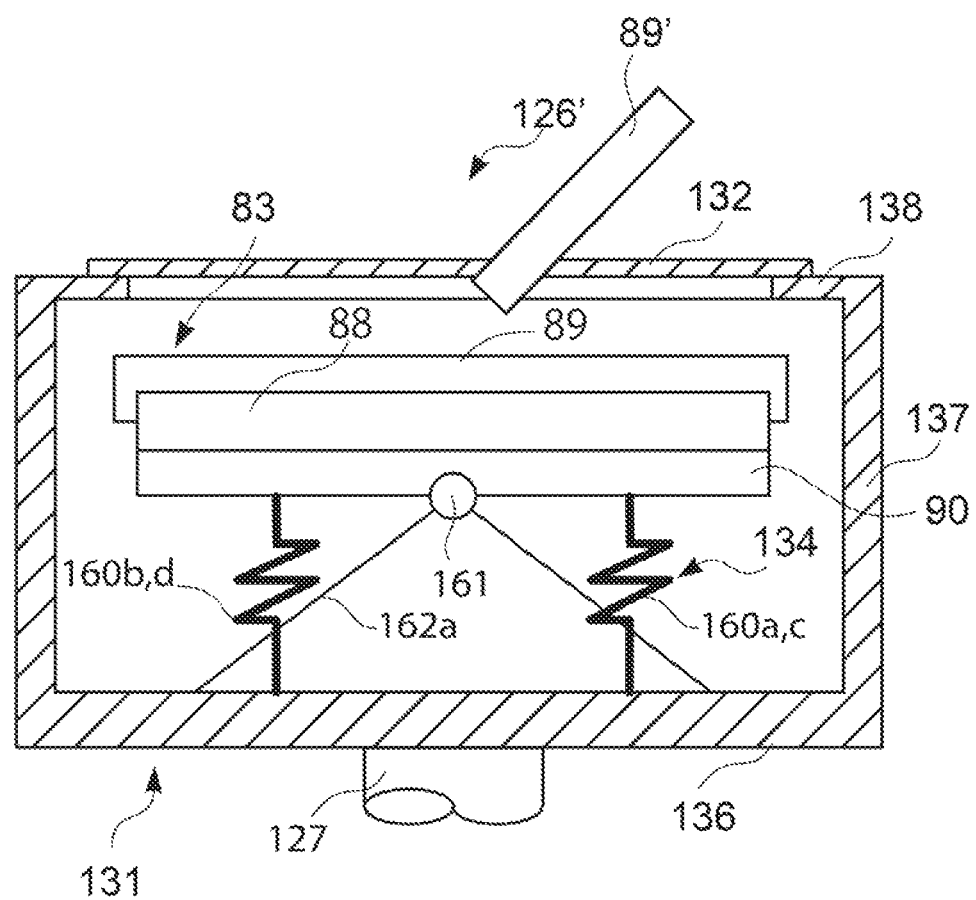
FIG. 12 is a schematic configuration view showing a drive unit of another embodiment.
Figure 13:
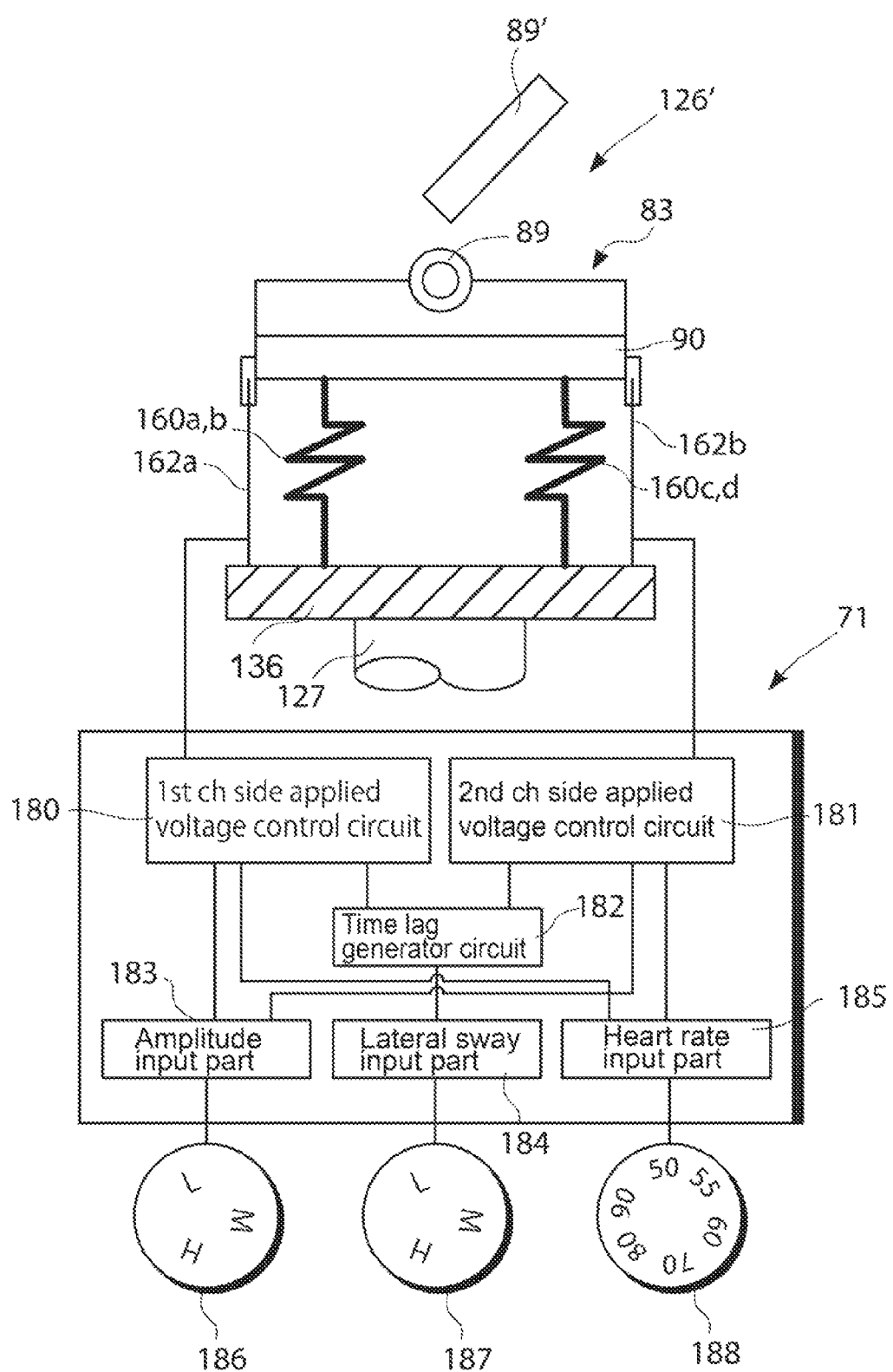
FIG. 13 is a schematic configuration view showing a drive unit of another embodiment and a schematic configuration view showing a controller.

Yet, for another example, said drive unit may be as shown by a notation 126' in FIGS. 12 and 13. This drive unit 126' will be explained below except that the components in common with the drive unit 126 shown in FIGS. 9 and 10 will be assigned the identical notations and will not receive a detailed explanation therefor.

Herein, FIG. 12 is a view showing the condition of the drive unit 126' as viewed from the lateral side of said simulated blood vessel 89; and FIG. 13 is a view showing the condition of the drive unit 126' as viewed from the axial side of said simulated blood vessel 89. The drive mechanism 134 for this drive unit 126' comprises four springs, 160a to 160d, for retention of retention plate 90 generally in parallel to a holder 131; a support shaft 161 that is provided at the lower end of said retention plate so as to cross in the across-the-width direction of said simulation body 83; and a left-and-right pair of wires 162a and 162b, the midway sections of which are fixated to the two ends of this support shaft 161, with both ends thereof being fixated to the above mentioned holder 131.

As evident from these Figures, in this drive mechanism 134, a pair of for-drive wires, 162a and 162b, are provided, in parallel to each other, at the two ends in the width direction of the above-mentioned holder 90, so as to be along the up-and-down direction (Z direction). In this respect the three wires, 148, 152, and 156 in embodiments shown in FIGS. 9 and 10 were provided to bisect each other at right angles along the X, Y, and Z directions, and had three degrees of freedom; but examples in the FIGS. 12 and 13 show that the wires 162a and 162b are provided to be in parallel to each other and have two degrees of freedom.

Figures 17A, 17B, 17C:
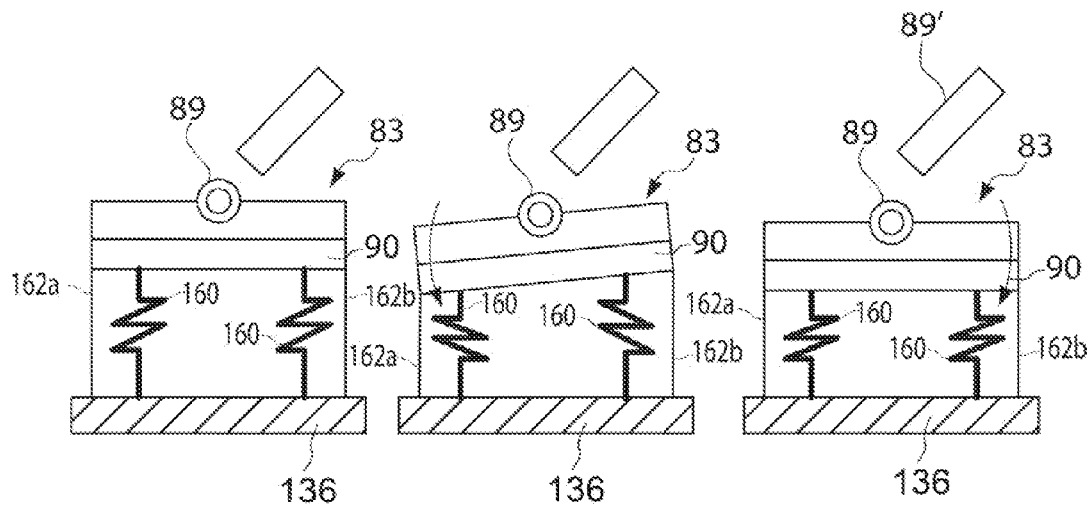
FIG. 17A to FIG. 17C are views showing the behavior of the simulation body that holds the simulated blood vessels.
Figure 14:
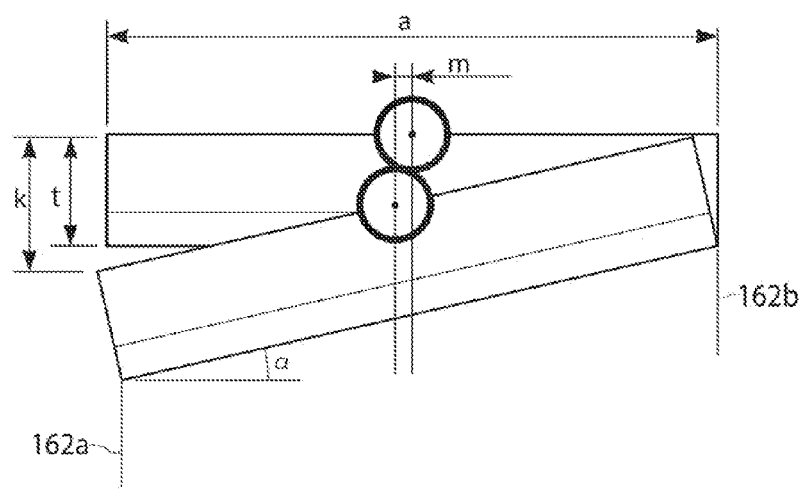
FIG. 14 is a view for illustrating the behavior of the simulated blood vessels.

In such a two-degrees of freedom drive system in this embodiment, a pulsation in the horizontal direction in addition to the up-and-down direction is generated by letting the movement of one of wires 162a lag from that of the other wire, 162b. FIG. 17A to FIG. 17C are views showing the behavior of the simulation body 83 in this case. FIG. 14 is a schematic view for illustrating the movement distance of the above mentioned simulated blood vessel 89 in such a movement. The amount of movement, m, of the above mentioned simulated blood vessel 89 in the horizontal direction is determined by the following equation:

$$m = \alpha\left(\frac{1}{2}a\sin\alpha + t\right)$$

where a is the width of the simulation body 83; t is the distance from the height at which the wire is attached to the said simulated blood vessel 89; and k is the variation in the up and down direction of one of the wires, 162a, relative to the other wire, 162b.

Figure 15:
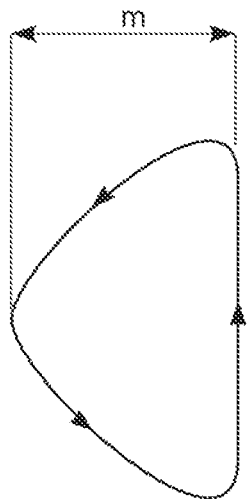
FIG. 15 is a view showing a movement locus of the simulated blood vessels.
Figure 16:
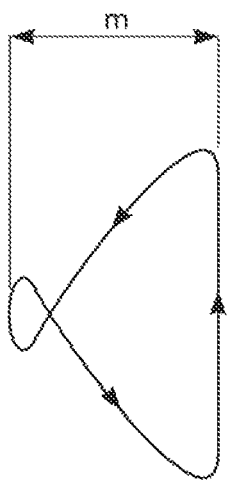
FIG. 16 is a view showing a movement locus of the simulated blood vessels.

Thereafter, when the other wire 162b is allowed to move at the same duty ratio as that of one of the wires, 162a, with a 10% lag, said simulated blood vessel 89 will end up moving in an approximately triangular locus as shown in FIG. 15. In order to generate such movement in a horizontal direction, it is necessary that there be a difference (shown as size t in the figure) between the height at which this wire 162a (162b) is attached and the height of the simulated blood vessel 89, whereby the center position of the above-mentioned blood vessel 89 is offset, which enables reproducing a three-dimensional pulsation movement as shown in FIG. 15. The ratio of lag for the wires to achieve this is preferably 10 to 20%. It is also possible to let the movement to occur so as to draw an 8-shaped locus as shown in FIG. 16 by increasing the value of the above-mentioned t.

Next, the configuration of controller 71 connected to this drive mechanism 134 is explained in reference to FIG. 13.

This controller 71 comprises a 1st channel side applied voltage control circuit 180 and a 2nd channel side applied voltage control circuit 181 for driving said paired wires 162a and 162b; and a time lag generator circuit 182 to provide a lag time to the timing of applying a current to the pair of wires 162a and 162, thereby generating a delay in movement between the wires 162a and 162b. In addition, this controller 71 is provided with three input parts, ie., an amplitude input part 183, a lateral sway input part 184, and a heart rate input part 185; and input dials, 186 to 188, are connected to the respective input parts 183 to 185. While the said 3-degrees-of-freedom drive mechanism had a configuration which called for choosing one of the nine predetermined patters, this embodiment is provided to allow the user to individually select, and set up, the amplitude and lateral sway. It is so provided to allow inputting stepwise, that is, to input the heart rate: non-stepwise from 50 beats to 90 beats; the amplitude: high (3 mm), medium (2 mm), and low (1 mm); and the lateral sway: high (20% lag time), medium (10% lag time), and low (0% lag time). This gives pulsation patterns that can be expressed, amounting to 3×3=9 patterns.

Such configuration is advantageous in that a complex pulsation behavior can be generated by a simple wire configuration of two degrees of freedom.

Further still, using the surgical operation training devices 13 of the above-described embodiment and exemplary variation, when performing anastomotic procedural training where, for a simulation blood vessel 89, at a portion of the blood vessel wall in its middle, for example, one end side of a new simulation blood vessel 89' is stitched together and the stitched blood vessel 89, 89' is made into a bifurcated state, the following aspects can be adduced as an evaluation of the stitched portion.

In other words, an intravenous drip-type static pressure load device that is not shown in the drawings, is connected to the other end side of the new simulation blood vessel, and by making the relevant static pressure load device higher than the anastomosis region and supplying, using gravity, a predetermined liquid from the static pressure load device to the inside of the simulation blood vessel 89, the existence of fluid leakages at the anastomosis region, such as the stitched portion, or shape changes thereof, etc. at the anastomosis region at those times can be easily evaluated. At such times, by varying the height of the static pressure load device, pressures added to the anastomosis region can be easily and freely adjusted without depending on pumps, etc.

It is to be understood that the above-described embodiments are illustrative of only a few of the many possible specific embodiments which can represent applications of the principles of the invention. Numerous and varied other arrangements can be readily devised by those skilled in the art without departing from the spirit and scope of the invention.

For example, it is additionally to be understood that for the connecting members of the above-described embodiment and exemplary variation, as long as the workings are similar to the above-described, other forms such as a thin plate, etc. can be adopted. Those materials, etc. would not be questioned, as long as they are shape memory materials that can contract when electric current flows through them.

Furthermore, in the above-described embodiment and exemplary variation, a simulation body 83 that simulates a part of a heart surface having a coronary artery is used. However, other simulations regarding biotis sues can be used. Applications of the present invention are possible as training devices for surgical operations with respect to biotissues having behaviors.

Also, instead of the above-described simulation body 83, biotissues of pigs, cows, goats, sheep, rabbits, etc. can be made the subject of the training and held in the covered treatment object 75 and, through the above-described surgical operation training device 13, pulsing can be provided, discretionally, to the biotissue. With this, although operation training using animal internal organs was conventionally performed under static circumstances, even with operation training using real animal internal organs, it can be discretionally performed under dynamic circumstances, and improvements in the effectiveness of the operation training can be expected.

In addition, the construction of each part of the device of the present invention is not limited to the structure shown in the drawings, and as long as the essential workings are similar, various kinds of changes are possible.

What is claimed is:

1. A training device for vascular anastomotic surgery for a simulated patient, comprising:
   a case arranged to lay out a simulated body cavity of the patient with a base and a frame installed above the base to enable a trainee to access the body cavity,
   a support member extending from the base of the case;
   a holder plate extending in X-Y directions held on the support member via a biasing member extending in a Z direction, configured to hold a simulated blood vessel extending in a Y direction thereon to enable a trainee to perform anastomotic practice on this simulated blood vessel;
   first and second wire members extending from two outer sides, respectively opposing in the X direction of the holder plate, and connecting to the support member, wherein said first and second wire members support the holder plate against bias from the biasing member, and said first and second wire members are configured to contract and expand independently according to an electric current that is applied thereon;
   a controller to control a movement of the holder plate by applying the electric current to each of said first and second wire members at intervals so that the simulated blood vessel has a cyclic movement within an X-Z plane, the cyclic movement including one of or a combination of rotational, twist and linear movements, and representing pulsation movements of vascular blood vessels located in the body of the patient.

2. The training device of claim 1, wherein said support member further comprises a mechanism that is operable to rotate a position of the holder plate so as to shift its origin of the XYZ coordinates and rotate its XYZ coordinates.

3. The training device of claim 1, wherein the controller comprises
   a time lag generator circuit to provide a lag time to the timing of applying the electric current to the first and second wires; and
   a lateral sway input unit to provide a plurality of degrees of lateral sway to the movement of the simulated blood vessel held by the holder plate by varying the lag time generated by the time lag generator circuit.

4. The training device of claim 1, wherein the controller further comprises
   a heart rate input unit to provide a plurality of degrees of heart rate to the movement of the simulated blood vessel held by the holder plate by varying the interval of the electric current applied to the first and second wires.

5. The training device of claim 1, wherein the controller further comprises
   an amplitude input unit to provide a plurality of degrees of amplitude to the movement of the simulated blood vessel held by the holder plate by varying a magnitude of the electric current applied to the first and second wires.

6. The training device of claim 1, wherein said first and second wires are formed of a shape memory material able to contract with respect to an original shape when an electric current flows through said wires.

7. The training device of claim 6, wherein said controller applies to said first and second wires a supply voltage of a predetermined waveform.

8. The training device of claim 7, wherein said supply voltage has a pulse wave, and said controller is arranged such that a duty cycle of said pulse wave is adjustable.

* * * * *